United States Patent [19]

Polzer et al.

[11] Patent Number: 4,488,778
[45] Date of Patent: Dec. 18, 1984

[54] EXTERIOR REAR-VIEW AUTOMOBILE MIRROR

[76] Inventors: Herwig W. Polzer, Philipp-Larenz-Str. 32, Freudenberg D-6982; Werner Seitz, Pfarrer-Nicolaistr. 2, Collenberg D-6981, both of Fed. Rep. of Germany

[21] Appl. No.: 359,700

[22] Filed: Mar. 19, 1982

[30] Foreign Application Priority Data

Apr. 18, 1981 [FR] France ................................ 81 07556

[51] Int. Cl.³ ............................ G02B 7/18; F16B 7/20
[52] U.S. Cl. ................................... 350/631; 248/466; 350/257; 279/89; 403/349
[58] Field of Search ...................... 350/288, 257, 318; 248/466, 475 R; 403/349; 279/89, 90

[56] References Cited

U.S. PATENT DOCUMENTS 1,206,973 12/1916 Archibald ..................... 248/475 R
3,131,251 4/1964 Ryan ............................. 248/475 R

FOREIGN PATENT DOCUMENTS 2549555 12/1977 Fed. Rep. of Germany ...... 350/631

Primary Examiner—Jon W. Henry
Attorney, Agent, or Firm—Andrus, Sceales, Starke & Sawall

[57] ABSTRACT

The fastening plate (5) of the glass support plate (9) attached to the mirror glass (9.9) is inside the exterior rear-view automobile mirror housing (3), which is shell-shaped and open on one side. This fastening plate is adjustable by means of a Cardan joint. The glass support plate is attached in an adjustable manner to the fastening plate by a clamp ring (7). For mounting the fastening plate, the clamp ring can be turned from the outside with a screwdriver or similar tool, from a position freeing the glass support plate to a position coupling the glass support plate with the fastening plate.

3 Claims, 4 Drawing Figures

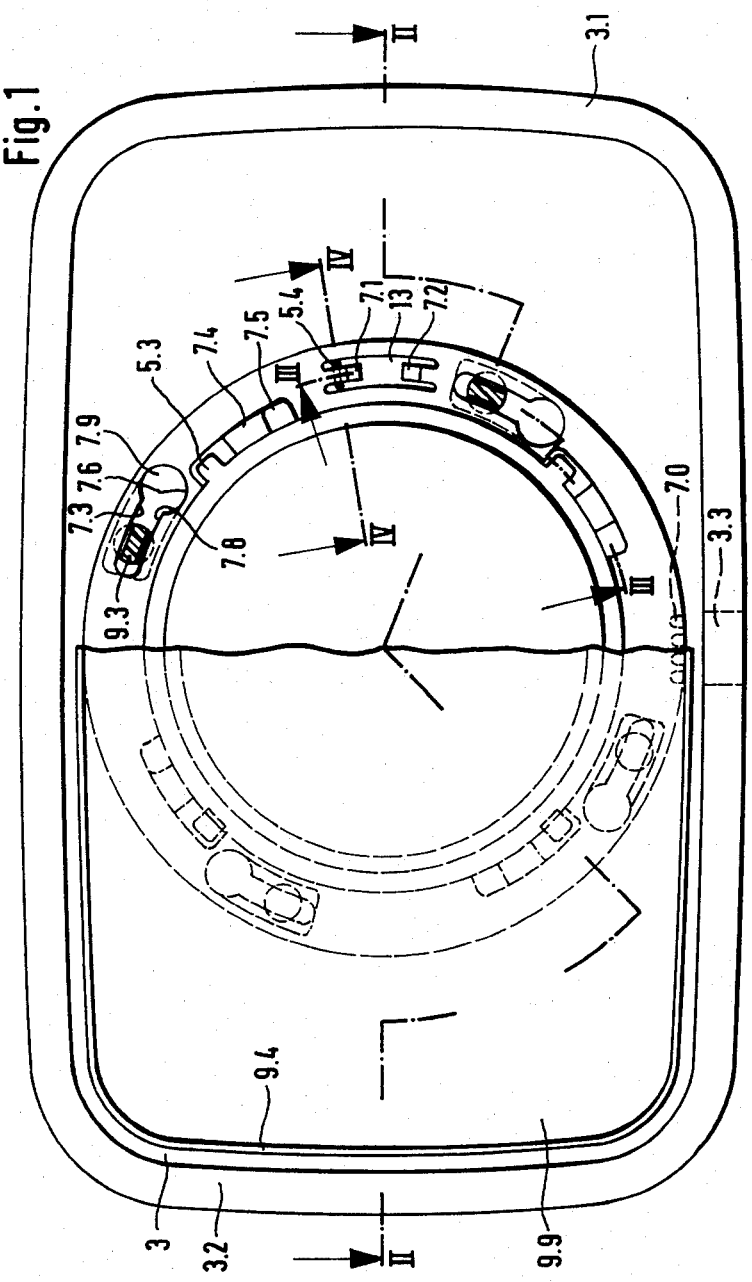

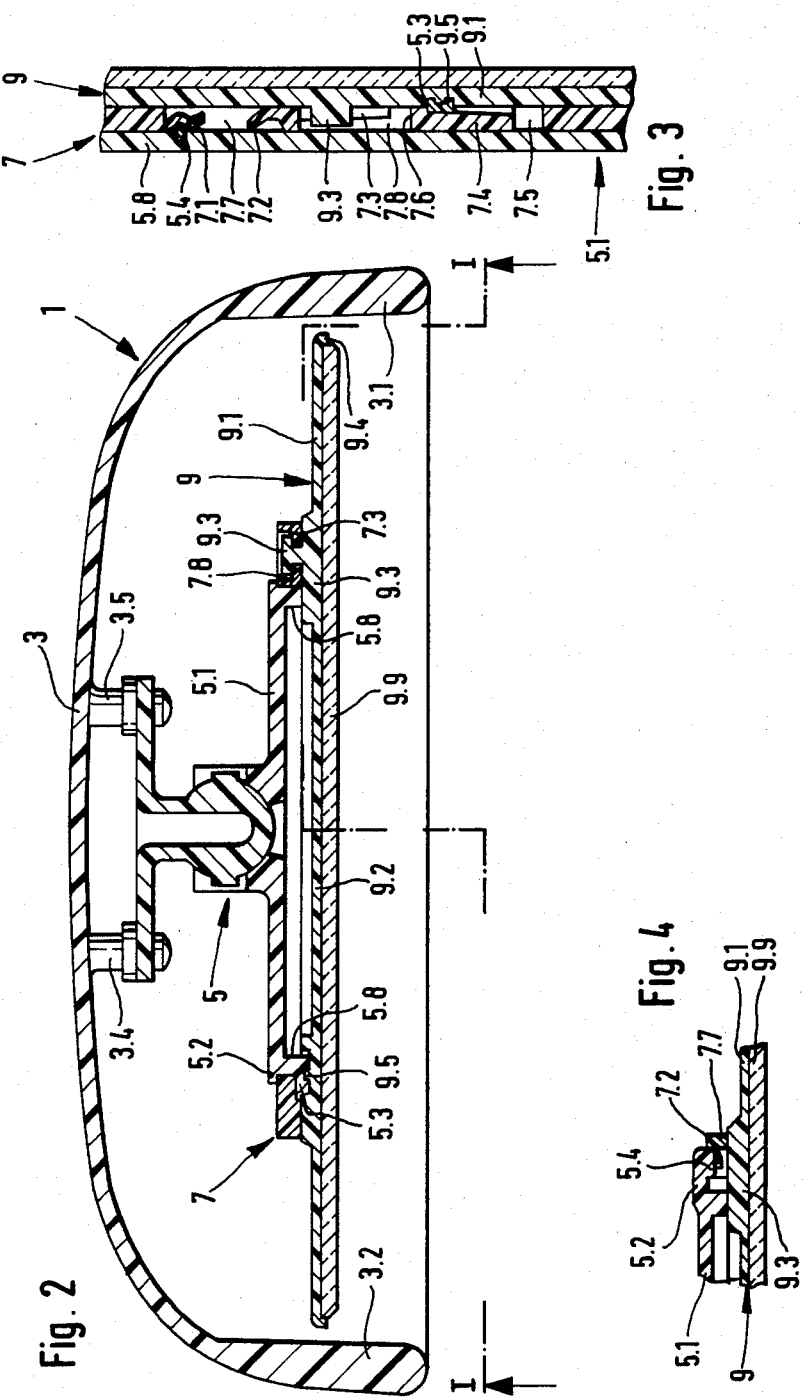

EXTERIOR REAR-VIEW AUTOMOBILE MIRROR

The present invention relates to an exterior, rear-view automobile mirror consisting of a shell-shaped mirror housing, attached to the outer side of the car body, and a mirror support that fits onto a pivot extending inwardly from the mirror housing, the mirror glass being mounted on a glass support plate.

On a conventional automobile, the articulation of the mirror support is subjected to the corrosive effects of dust, rain and ice and is relatively unprotected. A corroded mirror support prevents adjustment of the mirror and this is irritating for the driver and therefore dangerous in traffic.

As a result of the above, the entire mirror support can be fitted inside a shell-shaped housing so that the outer convex side of the housing can be turned in the direction necessary for adjustment, while surrounding and protecting the mirror support. The mirror housing, which is open toward the back, completely and protectively surrounds the glass support plate, which fastens the mirror glass. The mirror glass can be adjusted on the mirror support to the exact extent required. To simplify replacement of the glass support plate and the mirror glass without reverting to a modification on the rear-view mirror housing, and while the entirety is still attached to the car, the glass support plate can be positioned so that rotation on the mirror support is fixed and can be locked adjustably by means of a clamp ring. This clamp ring can be turned from the outside like a bayonet fitting. If the clamp ring is turned with a screw-driver or similar tool introduced through an opening in the mirror housing, the bayonet fitting is released and the clamp ring, along with the glass support plate and mirror glass, are separated from the mirror support.

According to the concept actualized in this invention, when replacing the mirror glass, the clamp ring—which is attached permanently to the glass support plate—is replaced along with it. Since the clamp ring must take on varied shapes and contours in its functional role, its manufacture is not inexpensive and thereby increases the cost of replacing the mirror glass. Aside from this, the assembly of the replacement glass support plate, which is attached permanently to the clamp ring on the mirror support, is relatively complicated. This is due to the fact that the clamp ring must rest on the plate support in a loose manner and is only lockable in a specific position on the mirror support.

To simplify the assembly of the replacement mirror glass and therefore decrease its cost, this invention introduces an exterior rear-view automobile mirror which consists of a mirror housing in a shell-shape which attaches to the outer car body, and a mirror support that fits onto a pivot extending inwardly from the mirror housing, the mirror glass being fixed on a glass support plate. The glass support plate can be positioned so that rotation on the mirror support is fixed and can be locked adjustably by means of a clamp ring, which can be turned from the outside like a bayonet fitting. The invention is also characterized by a clamp ring which is mounted in an adjustable manner, and which is guided in rotation on the mirror support independently of the glass support plate. For mounting a replacement mirror glass, according to this invention, the clamp ring, axially fixed on the mirror support, is maintained in the correct angular position using a tool introduced from the outside. The glass support plate is simply positioned on the mirror support and guided into the bayonet fitting on the clamp ring. Aside from this, according to this invention, the glass support plate can be manufactured with the mirror glass in a simpler way, which reduces costs.

A special advantage ensues from this invention since the mirror support has radial projections which can be locked, by virtue of their shape, with the positioning elements of the glass support plate, as well as having an axial guide rail behind the projections which projects radially for the clamp ring. The clamp ring, as well as the mirror support, possess stop elements which cooperate to acquire a grip with adjustable rotation. In this way, the clamp ring can first be placed on the mirror support and can be locked in by simple rotation during main assembly of the exterior rear-view mirror.

This invention is described in detail in the following, according to an exemplary embodiment, with reference to the corresponding attached drawings in which:

FIG. 1 represents a back-view of the exterior rear-view mirror, partially sectioned along the line I—I of FIG. 2, incorporating the features of this invention;

FIG. 2 is a view of the exterior rear-view mirror, sectioned along the line II—II of FIG. 1;

FIG. 3 is a view sectioned along the circumference line III—III of FIG. 1, showing the details of the exterior rear-view mirror of FIG. 1; and FIG. 4 is a view partially sectioned along the radial line IV—IV of FIG. 1 of the exterior rear-view mirror.

In mirror housing 3 of the exterior rear-view automobile mirror, indicated in its entirety by 1, several supports 3.4, 3.5 are arranged near the center, onto which the mirror support 5 is fastened. In this presented example of an exemplary embodiment, the mirror support 5 consists essentially of a ball joint articulation which allows rotation of the glass support plate 9 in all directions. Glass support plate 9 is attached to fastening plate 5.1 in the interior of the space surrounded by the lateral frame 3.1, 3.2 of the housing, extending toward the back of the device (i.e. the direction in which the vehicle usually moves; forward). In place of the depicted ball-joint articulation, an articulated link, moved with a motor or manually, for example with a Cardan shaft, can also be provided.

The circular fastening plate 5.1 possesses an axial projecting edge, 5.8. The glass support plate 9 with the mirror glass 9.9 are kept together against its frontal free surfaces by this projecting edge by means of clamp ring 7 after the assembly of the exterior mirror. The clamp ring surrounds the periphery of the fastening plate 5.1.

The clamp ring 7 has, on its side turned toward the glass support plate 9, four curved circumferentially distributed grooves 7.8 into which the extensions 9.3 (T-form in section) of the glass support plate 9 penetrate. The associated extension 9.3 of the glass support plate 9 can be introduced, by virtue of enlargement 7.9 at the corresponding extreme end of the grooves 7.8 and can be grasped from below through the base of groove 7.8 by rotation of the seal ring 7 by using a screwdriver introduced through opening 3.3 of the housing in the notches 7.0. In this manner, the glass support plate is coupled to the clamp ring 7 by four bayonet fittings (FIG. 1).

In fastening plate 5.1, on the edge moving away from the glass support plate 9, are attached one or several guide rails 5.2, circumferentially arranged for clamp ring 7. At the extreme end of ring 5.8, which is turned against glass support plate 9, fastening plate 5.1 exhibits radial projections 5.3—according to the example of the embodiment illustrated here, there are four reliefs—producing an external contour into which the positioning elements 9.5 can be fit and locked in, by virtue of their specially tapered shape and by having an appropriate corresponding form with regard to the position of glass support plate 9 on fastening plate 5.1. Between projections 5.3 and the guide rails 5.2, clamp ring 7 can turn around fastening plate 5.1, alternating between the locked position (FIG. 3) and the unlocked position—not shown here—by using the previously mentioned tool (i.e. screwdriver).

By positioning the clamp ring 7 on the fastening plate 5.1, this exposes openings 7.5 which are followed by a groove 7.4, the surface of which is elevated from the base following the peripheral direction. Following the peripheral direction, subsequent to each groove 7.4, there is a hollow 7.8 in the clamp ring 7 as shown in FIG. 1.

The position of the clamp ring, when locked, is determined by the interpenetration of a rib 5.4 on one of the guide rails 5.2 with an elastic latch 7.1, which goes from groove 13 to the periphery of the clamp ring 7.

The latch 7.1 in groove 13 pushes a stopping element 7.2 effective in so far as blocking then results on the fastening plate 5.1 so that stop element 7.2 plays the role of a block to rotation for the rib 5.4. If the clamp ring 7 is placed in the described manner on the fastening plate 5.1, it can turn in the rear angular space in which rib 5.4 can move itself freely between the latch 7.1 and the stop element 7.2. If clamp ring 7 is turned so that the rib 5.4 is positioned in front of the stop element 7.2, the extensions 9.3 are projected through the enlargements 7.9 of the hollows 7.8. In case of another clockwise rotation of clamp ring 7, shown in FIG. 1, when the rib 5.4 reaches under the latch 7.1, the base 7.3 of the hollow 7.8 grasps the extension 9.3 from below. The result is that glass support plate 9 is brought against fastening plate 5.1.

We claim:

1. An external rear view automobile mirror comprising:
   a shell-shaped mirror housing (3) attachable to the outer side of a car body;
   a mirror support (5) pivotally mounted within said housing;
   a glass support plate (9) for mounting the mirror glass; and
   a clamping ring (7) mounted on said mirror support (5) for reciprocal rotation with respect to said mirror support (5) and glass support plate (9) between a first position in which said clamping ring engages fasteners on said glass support plate for locking said glass support plate to said mirror support and a second position in which said clamping ring frees said fasteners and said glass support plate from said mirror support.

2. The mirror as claimed in claim 1 wherein said mirror support (5) includes radial projections (5.3) engaging positioning elements (9.5) of said glass support plate, said mirror support further including a radially projecting peripheral guide rail (5.2) for mounting said clamping ring (7) on said mirror support.

3. The mirror as claimed in claim 1 or 2 including stop elements on said clamping ring and said mirror support for determining the amount of reciprocal rotation of said clamping ring.

* * * * *